Nov. 18, 1958 S. C. LEONARD ET AL 2,861,241
SINGLE SHEET LOSS TESTER
Filed April 29, 1955 4 Sheets-Sheet 1

Fig. 1.

Inventors
Stephen C. Leonard,
Robert L. Ten Broeck,
Lewis R. Runaldue,
by Gilbert P. Tarleton
Their Attorney.

Nov. 18, 1958  S. C. LEONARD ET AL  2,861,241
SINGLE SHEET LOSS TESTER

Filed April 29, 1955  4 Sheets—Sheet 2

Inventors
Stephen C. Leonard,
Robert L. Ten Broeck,
Lewis R. Runaldue,
by Gilbert P. Tarleton
Their Attorney.

United States Patent Office 2,861,241
Patented Nov. 18, 1958

2,861,241

SINGLE SHEET LOSS TESTER

Stephen C. Leonard, Cheshire, Robert L. Ten Broeck, Pittsfield, and Lewis R. Runaldue, Dalton, Mass., assignors to General Electric Company, a corporation of New York Application April 29, 1955, Serial No. 504,722

13 Claims. (Cl. 324—34)

This invention relates to the determination of characteristics of magnetic materials, and more in particular to an improved method and apparatus for measuring the losses in strips of magnetic materials. While the invention hereinafter disclosed is perhaps of greatest interest in the determination of losses of single laminations of transformer cores, it will be obvious that the scope of the invention is not so limited.

Previous tests for determining the losses in transformer core laminations may be arbitrarily separated into three groups, the first group involving the determination of the losses in an assembled core, the second test involving the determination of losses in samples cut from single laminations, and the third test providing an indication of the losses in a single lamination strip prior to assembly of the core. In the past it has been common to apply only the first and second above stated tests, since equipment available for testing single complete laminations necessitated a considerable expenditure of time to adjust and was therefore not practical to employ from the production standpoint. The second test (i. e., testing of samples cut from single laminations) obviously resulted in the destruction of the lamination from which the sample was cut, and also necessitated the annealing of the sample in order to relieve cutting stresses. While the testing of samples is useful in determining the basic qualities of the lamination material, it has been found that no accurate correlation exists between the results of this test and the results of the test on the assembled core. Therefore, in order to predict the characteristics of a transformer core prior to assembly it is imperative to obtain a testing method that permits the determination of the quality of magnetic material in its simple lamination condition.

It is therefore an object of this invention to provide an improved method and apparatus for determining the loss characteristics of strips of magnetic material.

Another object is to provide a non-destructive method and apparatus for reducing the time required to measure the loss characteristics of strips of magnetic material.

Still another object of this invention is to provide an improved apparatus for determining the loss characteristics of strips of magnetic material requiring a minimum of adjustments and being readily adaptable to automatic operation.

A further object of this invention is to provide a non-destructive testing device for automatically measuring the loss quality of laminations of magnetic material at a predetermined flux density and indicating the loss measured directly in watts per pound.

Briefly stated, in accordance with one aspect of this invention, we provide a test jig having a magnetizing coil and a "B" coil surrounding a lamination to be tested, and an "H" coil disposed on each side of the lamination. The magnetizing coil is supplied with a current providing flux in the lamination. A voltage induced in the "B" coil controls a feedback arrangement to maintain a constant flux density in the lamination, and a portion of the "B" voltage is also applied to one coil of a wattmeter. The voltage output of the "H" coil is applied by way of an integrating amplifier having essentially an infinite impedance input to the other coil of the wattmeter. A computer circuit is provided in order that the wattmeter read directly in terms of watts per pound of lamination, and that the only information required to be manually set on the device are the weight, width, and length of the lamination being tested.

The invention will be better understood from the following description taken in connection with the accompanying drawings, and its scope will be pointed out in the appended claims.

Referring now to the block diagram (Fig. 1), a core lamination 10 to be tested is inserted in a magnetizing coil 11 and a "B" coil 12. An "H" 13 coil is positioned adjacent to the lamination 10, the axis of the "H" coil being parallel to the axis of the magnetizing coil and "B" coil. The magnetizing coil, "B" coil and "H" coil comprise a "test jig." Magnetizing current for inducing a flux in the lamination is supplied to the magnetizing coil 11 from a source of alternating current 14, such as a 115 volt 60 cycle supply, by way of an alternating current regulator 15 to maintain a constant input source for the magnetizing coil, a step down transformer 16, a band pass filter 17 to remove harmonics from the source voltage and thus produce as nearly as possible a sine-wave voltage, a potentiometer 18, and a power amplifier 19. The output voltage of the power amplifier is preferably a pure sine wave.

Figure 1:
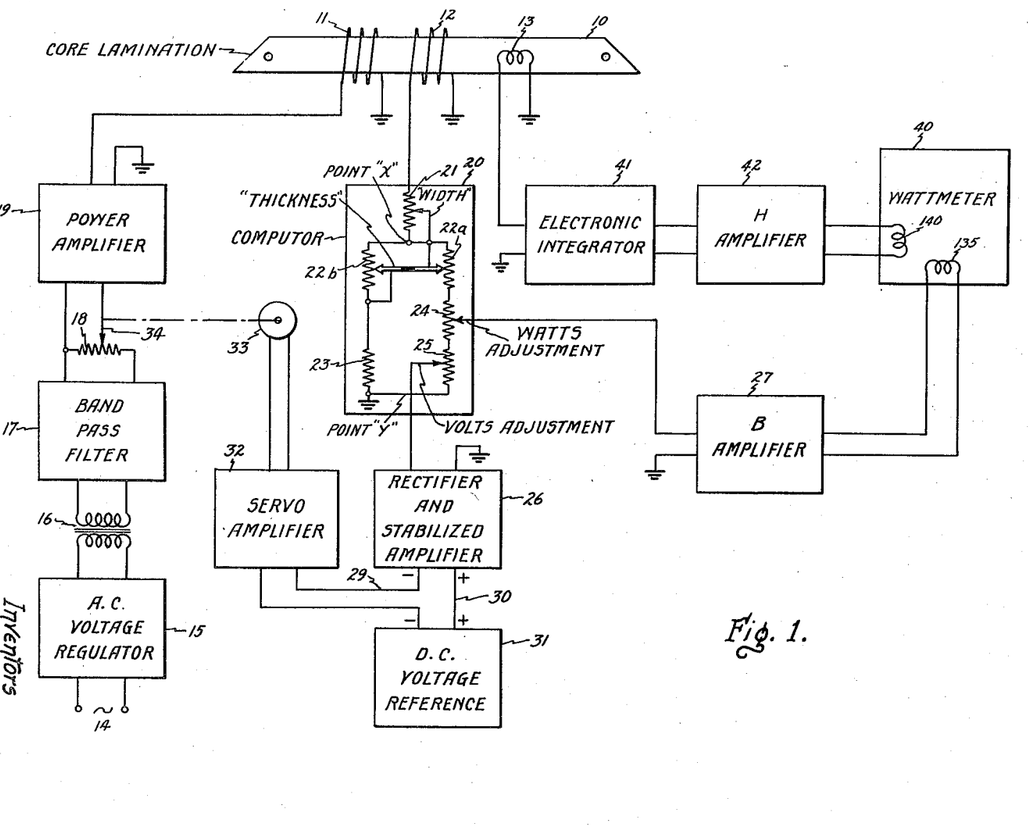
Fig. 1 is a partial block diagram illustrating one embodiment of the single sheet loss tester of this invention.

The voltage induced in the "B" coil 12 is proportional to the flux in lamination 10 being tested. This "B" coil voltage is proportional to the voltage needed to establish the flux level in the lamination and is applied to a computer circuit 20. The computer circuit is comprised of a "width" adjustment rheostat 21 in series with a parallel resistive circuit having one leg comprised of a series combination of "thickness" rheostat 22a, a "watts" adjustment potentiometer 24, and "volts" adjustment potentiometer 25. The other leg consists of a "compensator" rheostat 22b and a resistor 23. The "thickness" rheostat 22a and "compensator" 22b are mechanically coupled together and are so proportioned that variation thereof produces no change in the overall resistance of the parallel circuit from point "X" to point "Y." That is, an increase or decrease of resistance of rheostat 22(a) is accompanied by a decrease or increase respectively of resistance of rheostat 22(b) (by virtue of the mechanical coupling between the two rheostats) of such a magnitude that the resistance of the parallel circuit of rheostat 22(a) in series with potentiometers 24 and 25, and rheostat 22(b) in series with resistor 23 remains constant, and therefore the resistance between points "X" and "Y" remains constant. Thus a variation of the "thickness" adjustment does not vary the effect of the "width" adjustment. The parallel circuit resistance can be chosen to limit the minimum width sheet that the computer can handle. The arm of the "volts" potentiometer 25 is connected to a rectifier circuit and stable amplifier circuit 26, and the arm of the "watts" potentiometer 24 is connected to the "B" amplifier circuit 27. The computer circuit 20 is connected to the "B" coil. It is preferred that the rectifier circuit be of the averaging type.

The voltage appearing at the output leads 29 and 30 of the rectifier and amplifier circuit 26 is a unidirectional voltage proportional to the average of the alternating current voltage of the "B" coil 12. This output voltage (on leads 29 and 30) is connected in series opposition with the output voltage of a direct current voltage reference circuit 31, and the combined signal is applied to the input of a conventional servo amplifier 32. The output of the servo amplifier 32 is connected by conventional means to a servo motor 33, which is mechanically coupled to the arm 34 of potentiometer 18. The circuit comprised of the "B" coil, the computer, the rectifier and stable amplifier, the direct current voltage reference circuit, the servo amplifier and motor, and the potentiometer 18 serve to automatically maintain the flux density in the lamination at a constant value. This value is dependent upon the setting of the "width" and "thickness" adjustments of computer 20. These adjustments may be rapidly made, and the circuits are comprised of commercially available components.

As previously stated, the arm of the "watts" adjustment potentiometer 24 of computer circuit 20 is applied to the "B" amplifier 27. The "B" amplifier is a stable alternating current amplifier having no appreciable phase shift. The output of the "B" amplifier is applied to one winding of a light-beam wattmeter 40.

The voltage induced in the "H" coil 13 is proportional to the flux in the field adjacent to the lamination and is therefore proportional to the time derivative of the magnetomotive force adjacent to the lamination 10 being tested, since the core of this coil, as will be described in more detail later, is of non-magnetic material. The "H" coil voltage represents the mathematical derivative of that part of the current in the magnetizing coil necessary to magnetize the lamination directly under the "H" coil. The voltage of the "H" coil is applied to an electronic integrating circuit 41, and by way of an "H" amplifier 42 to the light-beam wattmeter 40. The "H" amplifier 42 is similar to the "B" amplifier 27. By integrating the "H" voltage, a voltage is obtained that is proportional to the current required to energize that portion of the lamination covered only by the area of the "H" coils.

Figure 2:
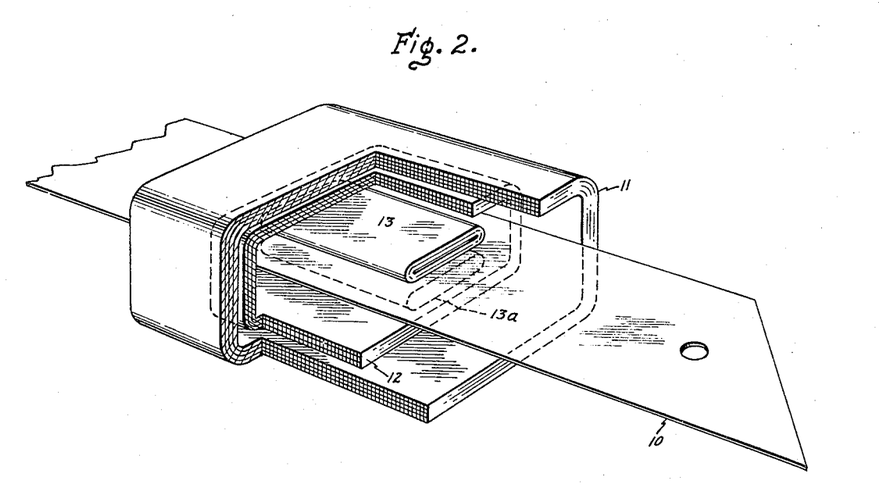
Fig. 2 is a partially cross-sectional perspective view of the elements of the test jig employed with this invention.

The basic construction of a suitable test jig is illustrated in Fig. 2. Therein the core lamination 10 to be tested is shown extending through the magnetizing coil 11 and the "B" coil 12, with the longitudinal dimension of the lamination being parallel to the axis of the magnetizing coil and the "B" coil. The "B" coil is positioned inside of the magnetizing coil. An "H" coil 13 is positioned adjacent the top side of the lamination and inside of the "B" coil. A similar "H" coil 13a is also positioned adjacent the bottom side of the lamination and inside of the "B" coil. The axis of each "H" coil is parallel to the axis of the "B" coil. The turns of the "H" coils do not encircle the lamination, but instead are wound on a non-magnetic form and are positioned as close to the lamination as possible. The magnetizing coil 11 is longer than the "B" coil, and extends beyond the ends of the "B" coil. As previously stated, the voltage induced in the "B" coil is proportional to the flux induced in the lamination 10. Therefore, it is desirable that the "B" coil be located as close as possible to the lamination. Since the terminals of the "B" coil are connected across a resistance network in the computer circuit, a current flows through the "B" coil, and this current may affect to some extent the magnetizing forces producing the flux in the lamination. Therefore, in order to determine more accurately the magnetomotive force drop in the lamination, it is desirable that the "H" coils be located inside of the "B" coil. The magnetizing coil 11 is made as long as possible in order that the flux linking the "B" and "H" coils be uniform. A magnetic return path (not illustrated) may be provided surrounding either all or part of the outside of the coils in order to increase the uniformity of the fields of the coils. In a modification of this arrangement, the "B" coil may be located inside of the "H" coil, however, this modification is preferred only if no current passes through the "B" coil.

*Theory of operation*

It has been shown by W. E. Shenk in "The Absolute Measurement of the Energy Loss in a Single Strip of Sheet Iron or Steel Under Alternating Magnetization," proceedings of the forty-fifth annual meeting of the American Society for Testing Materials, vol. 42, 1942, pages 597–598 that the power loss P per unit volume in a homogeneous iron core of uniform cross section, in which the magnetic field is uniform and parallel to the axis of the core is:

$$P = \frac{fn}{NA} \int eidt \qquad (1)$$

where $f$ is the frequency in cycles per second, $n$ is the turns per centimeter of length of the magnetizing coil, $N$ is the number of turns in a uniform secondary winding, such as the "B" coil surrounding the core, $A$ is the cross sectional area of the core in square centimeters, $e$ is the voltage induced in the secondary winding, and $i$ is the theoretical magnetizing current in the magnetizing winding assuming ideal circuit conditions.

The voltage $e_H$ induced in a coil, such as the "H" coil, located in the field adjacent the sheet will be equal to:

$$e_H = N_H \frac{d\phi}{dt} = N_H A_H \frac{dB}{dt} \qquad (2)$$

where $N_H$ is the number of turns on the "H" coil, $\phi$ is the total flux in the "H" coil, $A_H$ is the cross sectional area of the "H" coil, and B is the flux density in the "H" coil. Since the permeability of the medium enclosed by the "H" coil is unity, $$e_H = N_H A_H \frac{dH_s}{dt} \qquad (3)$$

where $H_s$ is the magnetomotive force drop in the sheet. Solving for $H_s$:

$$H_s = \frac{1}{N_H A_H} \int e_H dt \qquad (4)$$

Since the magnetomotive force is proportional to the product of the current $i$ and the turns $n$ of the magnetizing coil, $$i = \frac{H_s}{K_1 n} = \frac{1}{K_1 n N_H A_H} \int e_H dt \qquad (5)$$

and the power loss P per unit volume of sheet is:

$$P = \frac{fn}{NAK_1 n N_H A_H} \int e \left[ \int e_H dt \right] dt \qquad (6)$$

Thus integration of the voltage $e_H$ provides a current that represents the current $i$, and that current is applied to the wattmeter coil. The deflection of the wattmeter is proportional to the integral of the current applied to its coils, the average power per unit weight indicated by the wattmeter being:

$$\frac{P}{W} = \frac{K_2}{Ad} E_0 I_0 \cos \phi \qquad (7)$$

where $\phi$ is the phase angle between the effective output voltage $E_0$ of the "B" amplifier and the effective output current $I_0$ of the "H" amplifier, and $d$ is the density of the sheet.

In order to automatically compensate for the variation of the area A in Equation 7 so that the wattmeter 40 indicates watts per pound directly, the computer 20 is connected between the output of the "B" coil and the input of the "B" amplifier 27. The action of the computer is such that, when a setting is made on the width rheostat 21, thickness rheostat 22a and the compensator rheostat 22b that is related to the width and thickness of the lamination 10, the servo controlled voltage supply for the magnetizing coil 11 establishes a predetermined flux density $B_m$ in the lamination. The flux density $B_m$ in the lamination is equal to:

$$B_m = \frac{K_3 E_B}{A} \qquad (8)$$

where $K_3$ is constant for a given frequency of excitation and is inversely proportional to the number of turns of the "B" coil, $E_B$ is the voltage output of the "B" coil, and A is the cross-sectional area of the lamination 10 under test.

Since the output voltage of the rectifier and amplifier 26 is compared with a reference voltage, the servomechanism tends to maintain a constant voltage input to the rectifier, and thus maintains a constant voltage on the arm of the volts adjustment potentiometer 25 regardless of the setting of the width and thickness rheostats. In order to maintain this voltage constant, the output voltage of the power amplifier 19 may vary, thus varying the magnetomotive force of the magnetizing coil, and the output voltage of the "B" coil. By proper selection of the resistance values in the computer circuit, variations of the output voltage of the power amplifier 19 are such that a constant predetermined value of flux density is maintained in the lamination 10, and this predetermined value is dependent upon the setting of the volts adjustment potentiometer 25. The resistance values in the computer circuit are selected such that in order to maintain a constant flux density in various sized laminations it is only necessary to adjust the values of the width and thickness rheostats. The parallel arm of the computer 20 consisting of resistor 23 and thickness compensator 22b serves to maintain a constant resistance value between ground and the bottom of the width rheostat (at point "x") regardless of the setting of the ganged rheostats 22a and 22b so that the width and thickness settings are independent of each other.

Since the voltage on the arm of the volts adjustment potentiometer 25 is maintained at a constant value after adjustment in the calibration process, the current flowing through the leg of the computer circuit containing this potentiometer depends upon the setting of the arm of potentiometer 25, and this current is thus proportional to the flux density in the lamination. As a result, the input voltage $E_B'$ to the input of the "B" amplifier (on the arm of the "watts" adjustment potentiometer) is proportional to the flux density $B_m$ in the laminator, or:

$$E_B = K_4 B_m \qquad (9)$$

where $K_4$ is a constant depending upon the setting of the "watts" adjustment potentiometer 24, and the output voltage $E_{o1}$ of the "B" amplifier is:

$$E_{o1} = \alpha_B E_B' = \alpha_B K_4 B_M \qquad (10)$$

where $\alpha_B$ is the amplification factor of the "B" amplifier. Solving for the area A in Equation 8 and substituting $B_m$ from Equation 10 gives:

$$A = \frac{K_3 E_B \alpha_B K_4}{E_{o1}} \qquad (11)$$

Then from Equations 7, 8 and 11, $$\frac{P}{W} = \frac{K_2 E_{o1} I_o \cos \phi}{d K_3 K_4} \text{ watts} \qquad (12)$$

Thus by employing the computer circuit 20 and the servomechanism to maintain a constant flux density in the lamination and a constant voltage input to the "B" amplifier proportional to the flux density, the wattmeter 40 reads directly in terms of watts per pound of lamination, the term $$\frac{K_2}{d K_3 K_4}$$

being a constant.

The density $d$ of the sheets being measured will normally be constant, and thus no compensation for changes therein will be necessary. If it is desired to test sheets having different densities, the effect of the different densities may be compensated for by slight variations in the gain of either of the amplifiers, and, if desired such variations may be calibrated to correspond to the different densities.

*Typical circuit*

Figure 3A:
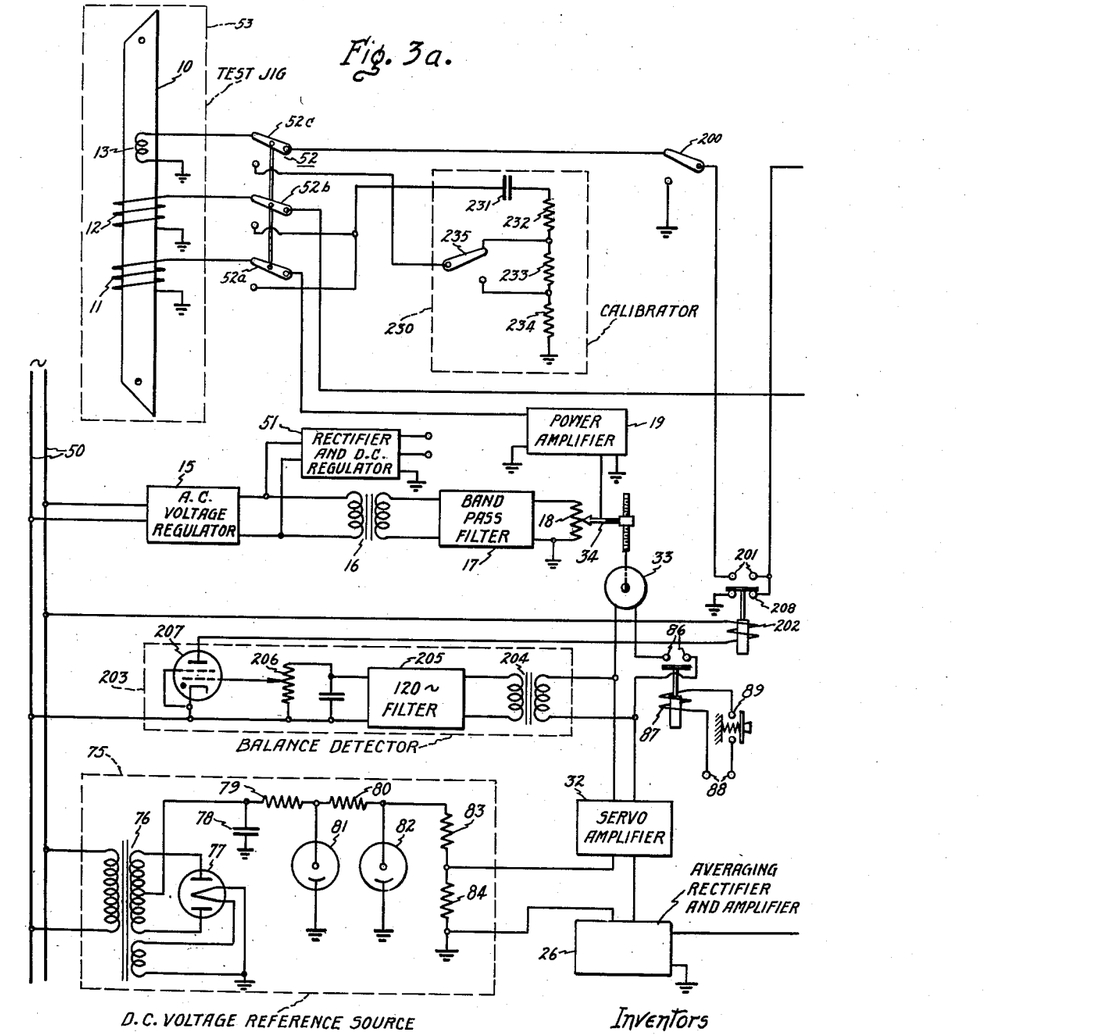
Fig. 3(a) and 3(b) is a circuit diagram of a typical single sheet loss tester designed according to this invention, Fig. 3(b) being a horizontal extension from the right hand side of Fig. 3(a)
Figure 3B:
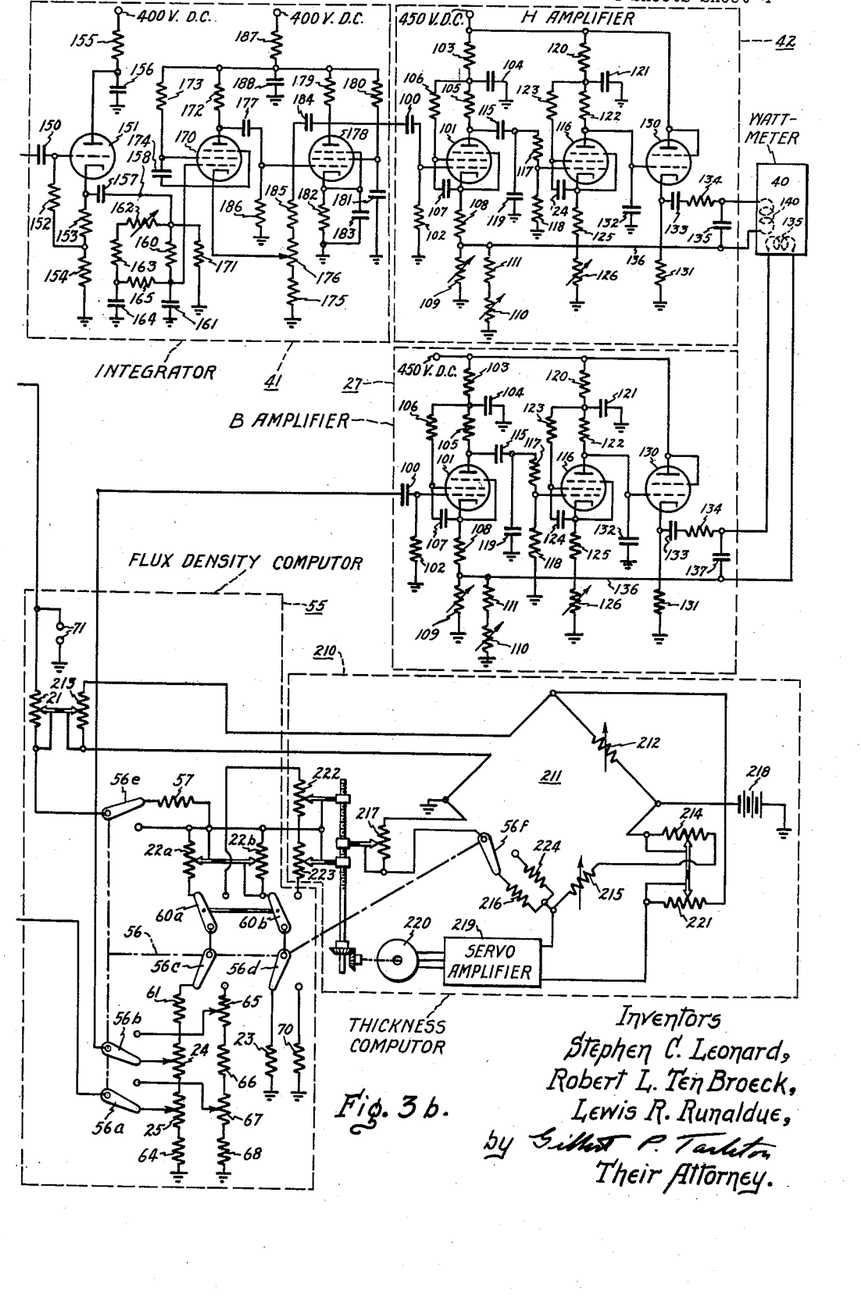

Referring now to the circuit diagram of Figs. 3a and 3b, in Fig. 3a the input of alternating current voltage regulator 15 is shown connected to 60 cycle alternating current supply lines 50. The output of the regulator 15 is connected to the primary winding of step down transformer 16, and also to a conventional rectifier and direct current regulator circuit 51. The rectifier and direct current regulator 51 may be used to supply a stable voltage for various circuits of the loss tester. The secondary winding of step down transformer is connected to the band pass filter 17. The band pass filter is tuned to 60 C. P. S., and serves to remove the harmonic components of the voltage so that the output voltage applied to potentiometer 18 is as nearly a sine wave as possible. The arm 34 of potentiometer is connected to the input of power amplifier 19, and the output of the power amplifier is connected by way of the center arm of switch 52a of a ganged "test-calibrate" switch 52 (shown in "test" position) to the magnetizing coil 11.

The "B" coil 12 of the test jig is connected by way of switch 52b of "test-calibrate" switch 52 to one end of "width" adjustment rheostate 21 in the flux density computer circuit 55 (Fig. 3b), (which serves the same function as the computer circuit 20 of Figure 1). The other end of the "width" adjustment rheostat 54 is connected by way of switch 56e of range switch 56 to a resistance 57, wihch is in turn connected to one end of each of the ganged "thickness" adjustment rheostat 22a and "compensator" rheostat 22b. The other ends of the "manual thickness" rheostat 22a and "compensator" 22b are connected by way of ganged automatic-manual thickness adjustment switches 60a and 60b respectively (shown in manual position) to the center arms of switches 56c and 56d respectively of range switch 56.

The range switch 56 is employed to readily enable testing of laminations of several different ranges of thickness. Thus in one position of the range switch (as shown in Fig. 3b) the circuit values of the loss tester of this invention may be selected to test laminations having thicknesses of 14 mils plus or minus 10%, while the other range may have circuit values to test laminations having thicknesses of 12 mils plus or minus 10%.

When the range switch is in the position shown in Fig. 3b, the bottom end of "thickness" rheostat 22a is connected to ground by way of resistor 61, "watts" adjustment potentiometer 24, "volts" adjustment potentiometer 25, and resistor 64, while in the other range the bottom end of the "thickness" potentiometer 22a is connected to ground by way of "watts" adjustment potentiometer 65, resistor 66, "volts" adjustment potentiometer 67 and resistor 68. Similarly, when the range switch is in the position illustrated in Fig. 3b the bottom end of "compensator" 22b is grounded by way of resistor 23, while in the other range the "compensator" 22b is grounded by way of resistor 70. A pair of terminals 71 are provided between the top end of "width" rheostat 21 for calibration purposes as will be described later.

The values of resistors and potentiometers are so adjusted that for a given range, when the resistance of the ganged "thickness" rheostat 22a and compensator 22b are varied, the resistance between the bottom end of the "width" rheostat 21 and ground remains constant.

The voltage appearing on the arm of "volts" adjustment potentiometer 25 (or potentiometer 67 depending upon the operating range) is connected by way of range switch section 56a to an alternating current amplifier having voltage feedback through a rectifier. The output of the rectifier in this unit is proportional to the average of the input voltage. This type of circuit is employed since the voltage input may not be a pure sine wave. The output voltage of the rectifier is connected in series opposition with a direct current voltage reference source 75, and the difference voltage is then applied to the input of a conventional servo amplifier 32. The direct current voltage reference may be of any type producing a stable output voltage, such as a battery or the conventional reference source illustrated in Fig. 3a. As illustrated, the reference source is comprised of a full wave rectifier circuit consisting of transformer 76 and rectifier tube 77, a filter capacitor 78, two stages of regulation consisting of resistances 79 and 80 and voltage regulating tubes 81 and 82, and voltage dividing resistances 83 and 84, the output voltage appearing across resistor 84. The output voltage from the servo amplifier 32 is connected to servo motor 33 by way of the normally open contacts 86 of relay 87. The relay 87 is energized from a source of voltage at terminals 88 when the manual "operate" switch 89 is closed. Thus the servo motor will turn only when the "operate" switch 89 is closed. The servo motor drives the arm 34 of potentiometer 18.

The circuit as disclosed thus far provides automatic means for maintaining a constant flux density in the lamination 10 when the width and manual thickness rheostats are set to values corresponding to the width and thickness of the lamination. The magnitude of this flux is determined by the setting of the "volts" adjustment potentiometers 25 and 67.

The voltage appearing on the arm of "watts" adjustment potentiometer 24 (or on the arm of "watts" adjustment potentiometer 65 depending on the setting of the range switch section 56b), is applied to the input of the "B" amplifier 27. The "B" amplifier is an alternating current amplifier having negligible phase shift and a predetermined transconductance. Although other circuits satisfying these conditions may be employed, the circuit illustrated in Fig. 3b has been found to be very satisfactory. The first stage of this amplifier is comprised of an input capacitor 100, a first amplifier tube 101, control grid resistor 102, a plate dropping resistor 103, and filter capacitor 104, a plate load resistor 105, a screen dropping resistor 106, and screen by-pass capacitor 107, a fixed bias resistor 108, a coarse bias adjustment rheostat 109 and a fine bias adjustment rheostat 110 in series with resistor 111. The second amplifier stage is comprised of an input capacitor 115 coupling the plate of the first amplifier tube 101 to the control grid of second amplifier tube 116, input voltage dividing resistors 117 and 118, a capacitor 119 connected between the control grid and ground to eliminate spurious oscillations, a plate dropping resistor 120 and by-pass capacitor 121, a plate load resistor 122, a screen dropping resistor 123 and screen by-pass capacitor 124, a fixed bias resistor 125 and a bias rheostat 126. The plate of the second amplifier tube 116 is coupled directly to the control grid of a cathode follower tube 130 having a bias resistor 131. A capacitor 132 connected between the control grid of the cathode follower and ground prevents spurious oscillations. The output of the amplifier is connected from the cathode of the cathode follower by way of a coupling capacitor 133 and resistor 134 to one coil 135 of the light-beam wattmeter 40. In order to reduce phase shift in the amplifier a feedback is provided by means of lead 136 between the output and the cathode circuit of the first amplifier tube 101. A capacitor 137 across the wattmeter coil 135 aids in eliminating spurious oscillations. The second stage of the amplifier is directly coupled to the cathode follower in order to eliminate one phase shift introducing coupling network. Typical values for the components of the "B" amplifier may be as follows: Tubes 101 and 116 are 6BH6's, tube 130 is a 6L6, resistors 102 and 105 are 500,000 ohms, resistors 103 and 122 are 100,000 ohms, capacitors 104, 107, 121, and 124 are 20 mfd., resistor 106 is 2.2 megohms, resistor 108 is 4000 ohms, rheostat 109 is 500 ohms, rheostat 110 and resistor 111 are 10,000 ohms, capacitor 115 is 0.01 mfd., resistor 117 is 290,000 ohms, resistor 118 is 600,000 ohms, capacitor 119 is 0.0015 mfd., resistor 120 is 50,000 ohms, resistor 123 is 300,000 ohms, resistor 125 is 2000 ohms, rheostat 126 is 1000 ohms, resistor 131 is 5000 ohms, capacitor 132 is .001 mfd., resistor 134 is 5000 ohms and capacitor 137 is 0.005 mfd.

The "H" amplifier may be identical to the "B" amplifier, therefore identical reference numerals have been used on the "H" amplifier as on the "B" amplifier. The output of the "H" amplifier is connected to a second coil 140 of the light-beam wattmeter 40.

The gain of the "B" and "H" amplifiers is adjusted by means of the coarse and fine bias rheostats 109 and 110, and the rheostat 126 adjusts the operating point of the cathode follower tube 130.

The electronic integrator

The electronic integrator 41 (Fig. 3b) is comprised of a cathode follower stage having a phase shifting network, and two amplifying stages. The cathode follower stage has an input capacitor 150 connected to the control grid of cathode follower tube 151, a grid resistor 152 having one end connected to the control grid of the tube 151 and the other end connected to the junction of series cathode resistors 153 and 154. The plate of the tube is connected to a source of direct current potential by way of plate dropping resistor 155, and by-pass capacitor 156 is connected between the plate of the tube 151 and ground. A coupling capacitor 157 couples the cathode of tube 151 to a point 158 on an integrating network comprised of a first resistor 160 in series with a first capacitor 161, the series combination being in parallel with a series circuit comprised of rheostat 162, second resistor 163 and second capacitor 164, and a third resistor 165 is connected between the junctions of the first resistor 160 and first capacitor 161 and the second resistor 163 and second capacitor 164. This integrating network is the subject of copending application Serial No. 588,925, filed June 1, 1956, now Patent No. 2,846,643, of A. H. Foley and assigned to the present assignee. The output from the integrating network from the junction of first resistor 160 and first capacitor 161 is connected to the control grid of a first amplifier tube 170. A resistor 171 in parallel with the integrating network serves as a grid resistor for the tube 170. The first amplifier stage is comprised of a plate load resistor 172, a screen dropping resistor 173 and by-pass capacitor 174, a fixed bias resistor 175, and a gain control bias potentiometer 176. The output of the first amplifier stage is coupled by means of capacitor 177 to the control grid of second amplifier tube 178. The second amplifier stage is comprised of plate load resistor 179, screen dropping resistor 180 and screen by-pass capacitor 181, cathode bias resistor 182 and by-pass capacitor 183, a feedback from the plate of tube 178 to the cathode of tube 170 comprised of capacitor 184 and resistor 185, and in control grid resistor 186. The feedback reduces overall phase shift in the amplifier stages, so that the amplifier has only a negligible amount of phase shift. The plate load resistors of the two amplifier stages may be connected by way of resistor 187 to a source of direct current potential, and the supply voltage may be filtered by a capacitor 188.

Figure 4:
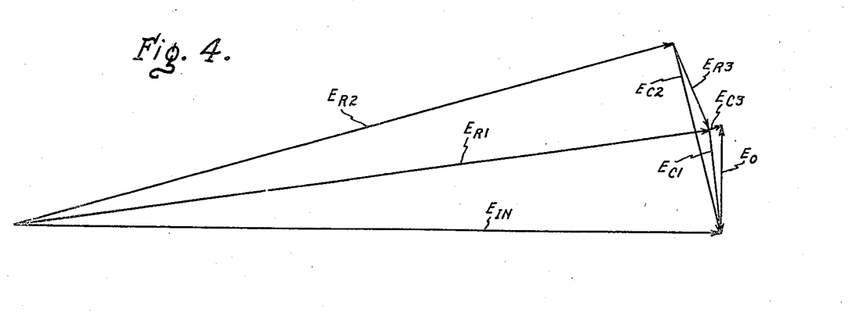
Fig. 4 is an exaggerated vector diagram of the voltages in the integrating circuit of Fig. 3.

Referring now to Fig. 4, therein is illustrated an exaggerated vector diagram of the voltages of the integrating network comprised of resistors 160, 163, and 165, potentiometer 162, and capacitors 161 and 164. The vector $E_{in}$ represents the voltage applied to the integrating network between point 158 and ground. The ratio of resistance of first resistor 160 to the reactance of first capacitor 161 is preferably about 20:1, while the ratio of resistance of second resistor 163 and potentiometer 162 to the reactance of second capacitor 164 is somewhat less, being about 10:1. Therefore, the angle between the vector $E_{r2}$ (representing the voltage across resistance 163 and rheostat 162) and the vector $E_{in}$ is greater than the angle between the vector $E_{r1}$ (representing the voltage across resistor 160) and the vector $E_{in}$, and the vector $E_{c2}$ (representing the voltage across capacitor 164) is greater than the vector $E_{c1}$ (representing the voltage across capacitor 161). Since the resistors 165 is connected across the junctions between resistor 160 and capacitor 161, and resistor 163 and capacitor 164, the voltage across resistor 165 is represented by the vector $E_{r3}$, the difference between vectors $E_{c1}$ and $E_{c2}$. Since the current flowing through resistor 165 also flows through capacitor 161, a voltage appears across capacitor 161 due to this current and this voltage is represented by vector $E_{c3}$ and is perpendicular to the vector $E_{r3}$. Since the output of the integrating circuit is taken across the capacitor $E_{c1}$, the output voltage is represented by the vector $E_o$ which is the sum of vectors $E_{c1}$ and $E_{c3}$. It is noted that, while the vector $E_{c1}$ can never be at right angles (90° phase shift) to the vector $E_{in}$, the addition of the vector $E_{c3}$ to vector $E_{c1}$ makes it readily possible to obtain an output voltage $E_o$ having a 90° phase relation to the input voltage $E_{in}$. This phase relation may be varied slightly by varying the rheostat 162. Assuming the voltage applied to the integrating network to be a sine wave, then the integral of the voltage input is a cosine curve, and the 90° phase shifter herein disclosed integrates the output of the cathode follower tube 151. This integrator has the advantage that the phase angle of the output varies much less as a function of frequency than in the case of the conventional series resistance-capacitance phase shifter.

The output of the "H" coil 13 is connected to the input of the integrator circuit 41 by way of "test-calibrate" switch 52c, "zero-operate" switch 200 and the contacts 201 of balance detector relay 202 in balance detector 203 (to be described in more detail later). When the "zero-operate" switch 200 is in "zero" position, the input of the integrator is grounded, so that any spurious voltage output of the "H" amplifier may be compensated for during calibration of the system.

Typical values of the components of the integrator circuit for operation with input voltages having a primary frequency of 60 cycles may be as follows: Tube 151 is a 12A17, amplifier tubes 170 and 178 are 6AU6's, capacitors 150, 161, 164 and 184 are 0.1 mfd., resistors 152 and 186 are 1 megohm, resistor 153 is 4900 ohms, resistor 154 is 100,000 ohms, resistor 155 is 200,000 ohms, capacitors 156 and 181 are 30 mfd., capacitor 157 is 1 mfd., resistors 160, 165, 172 and 185 are 500,000 ohms, rheostat 162 is 50,000 ohms, resistor 163 is 175,000 ohms, resistor 171 is 2 megohms, resistor 173 is 2.2 megohms, capacitors 174 and 188 are 20 mfd. resistor 175 is 2000 ohms, potentiometer 176 is 1000 ohms, capacitor 177 is 0.01 mfd., resistor 179 is 250,000 ohms, resistor 180 is 820,000 ohms, resistor 182 is 800 ohms, capacitor 183 is 100 mfd. and resistor 186 is 49,000 ohms. The plate of the amplifier tube 178 is coupled by coupling capacitor 100 to the grid of the first amplifier tube 101 of the "H" amplifier.

The balance detector

When a lamination 10 is first inserted in the test jig 53 the voltage output of the "B" coil may be such that a large connection must be made on the arm 34 of potentiometer 18 in order to attain the desired flux density in the lamination. This results in large momentary signals being applied to the wattmeter 40 coils until the servomotor 33 has stopped operating. Such large voltages may damage the sensitive light-beam movement in the wattmeter. In order to prevent such damage, a balance detector circuit 203 (Fig. 3a) disengages movement of the wattmeter when the servo system is carrying the arm of potentiometer 34. The balance detector is comprised of a transformer 204 having a primary winding connected to the input leads of the servomotor 33 and a secondary winding connected to a 120 cycle filter 205. The output of the filter 205 is connected across a potentiometer 206, and the output from the arm of the potentiometer is connected to the grid of a gas tetrode 207. The plate of the gas tetrode is connected to one of the alternating current supply lines 50 by way of a balance relay coil 202, and the cathode of the gas tube is connected to the other of the supply lines 50. The balance detector is connected such that, when a voltage appears at the output terminals of the servo amplifier 32, the gas tube is non-conductive due to a bias voltage appearing across potentiometer 206, and the contacts 208 of the balance relay 202 ground the input to the integrator circuit 41 (Fig. 3b), thereby preventing movement on the wattmeter. When no voltage appears at the output of the servo amplifier 32, the gas tube 207 is conductive since the bias due to voltage across potentiometer 206 is removed, and the contacts 201 of balance relay 202 connect the input to the integrator to the H coil 13 by way of "zero-operate" switch 200 and "test-calibrate" switch 52c.

The thickness computer

In the previously disclosed circuit, it was necessary to manually adjust the "thickness" rheostat 22a and "compensator" 22b according to the thickness of the lamination 10 being tested. The determination of the thickness of the lamination necessitates the measurements of thickness at several points and an averaging of the individual measurements, since the lamination may not have uniform thickness. This requires a considerable amount of time, and it is therefore desirable to have the thickness measured automatically in terms of more readily determined factors, and also to have the thickness factor automatically controlled in the system. The average thickness of a lamination is equal to:

$$t = \frac{1000W + W_h}{dLb} \text{ mils}$$

where W is the weight of the lamination in pounds, $W_h$ is the weight of any material removed from the lamination in pounds, $d$ is the density of the lamination and is a constant, L is the length of the sheet and $b$ is the width of the lamination. This equation is readily solved by the thickness computer circuit 210 of Fig. 3b. In this circuit, one leg of a bridge circuit 211 is comprised of a rheostat 212 whose resistance is manually adjusted to be directly proportional to the length L of the lamination, an adjacent leg of the bridge is comprised of a rheostat 213 whose resistance is manually adjusted to be inversely proportional to the width $b$ of the lamination, the other adjacent leg of the bridge is comprised of a series combination of a rheostat 214 whose resistance is manually adjusted to be proportional to the weight W of the lamination and a rheostat 215 whose resistance is manually adjusted to be proportional to the weight $W_h$ of material removed from holes drilled in the lamination. The opposite leg of the bridge contains a fixed resistance 216 proportional to the expected minimum thickness of a sheet of lamination material nominally 12 mils thick. Rheostat 217 in series with resistor 206 is proportional to the thickness of one sheet over the range of thickness to be measured. The resistor 216 may be varied to compensate for variations in the density of the sheet being tested. A potential is applied across opposite corners of the bridge by means of a suitable source of voltage 218, and the other corners of the bridge are connected to the input of a servo amplifier 219. The servo amplifier is connected to a servomotor 220 which controls the setting of the arm of potentiometer 217. When the rheostats 212, 213, 214 and 215 are manually set to values proportional respectively to the length, width, weight and hole weight of the lamination, the resistance of rheostat 217 is automatically adjusted to be proportional to the thickness of the lamination when the bridge is balanced. A resistor 221 with non-linear taps in series with the input to servo amplifier 219 is mechanically coupled to the "weight" rheostat in order to compensate for changes in gain. The "width" adjustment 213 may be manually coupled to the "width" adjustment 21 of the flux density computer circuit 55. The servomotor 220 also controls the resistance of rheostats 222 and 223 which are connected in the flux density computer circuit in place of "thickness" rheostat 22a and compensator 22b respectively when the switches 60a and 60b are in "automatic" position. The switch 56f of ganged range switch 56 replaces resistance 216 in the bridge circuit with resistance 224 to change the range of the computer from a nominal value of 12 mils to a nominal value of 14 mils.

*The calibrator and calibration*

In order to check the accuracy of the loss tester, a calibration standard circuit 230 (Fig. 3a) is provided. This circuit is comprised of a series circuit of a capacitor 231, and three resistances 232, 233 and 234. When the "test-calibrate" switch 52 is in "calibrate" position, the capacitor 231 is connected to the "width adjust" rheostat 21 (Fig. 3B) and the output of power amplifier 19 (Fig. 3a), and the input of the integrator 41 (Fig. 3b) is connected to the junction of resistors 232 and 233 or 233 and 234 depending upon the position of "range switch" 235. The other end of resistor 234 is grounded. This calibrator circuit simulates a hypotential lamination of known characteristics, such as power loss per pound, width, thickness and power factor.

In order to calibrate the instrument, the "width" rheostat 21, "thickness" rheostat 22a and "compensator" 22b, "weight" rheostat 214, "hole weight" rheostat 215, and "length" rheostat 212 are set to values corresponding to a hypotential lamination, having a known loss characteristic, the "automatic-manual" thickness switch 60 is set to manual position, the "test-calibrate" switch 52 is set to "calibrate," the calibrator range switch 235 is set to the same range as the range switch 56, and the "operate-zero" switch 200 is set to the "zero" position.

The first step of the calibration consists of setting the mechanical zero of the wattmeter by conventional means (not shown). This adjustment compensates for spurious voltages arising in the integrator 41 and "H" amplifier 42. Then, with the "operate-zero" switch 200 returned to "operate" position, and a voltmeter (not shown) connected to terminals 71 in the flux density computer circuit 55, the "volts" potentiometer 25 is adjusted until a predetermined voltage corresponding to the desired flux density in the hypotential sample is indicated on the voltmeter.

If desired the "volts" potentiometer 35 may be calibrated so that power loss readings may be obtained for a number of different flux densities in the sheet.

A predetermined portion of the voltage indicated by the voltmeter appears at the input to the integrator due to the action of the calibrator 230. In the next step of calibration, the "watts" potentiometer 24 is adjusted, thereby adjusting the input voltage to the "B" amplifier, until a predetermined loss is indicated by the wattmeter 40. When the "manual-automatic" thickness switch is turned to the "automatic" position, the volts indicated on the voltmeter and the loss indicated on the wattmeter should not change. A similar procedure is followed for calibration of the other range.

While this invention has been disclosed with particular reference to determining the losses of single sheets of magnetic material, it may also be adapted as a continuously measuring quality control apparatus for use on continuously moving sheets. In this case the thickness factor may be automatically applied to the computer by means of thickness measuring apparatus such as X-ray gauges, beta gauges, or mechanical gauges. Similarly, the width factor may also be automatically applied to the computer, so that no manual adjustment is necessary. Although the results of this test are not necessarily related to the loss in the cut laminations, it does give an indication of the quality of the sheet.

In a modification of the circuit of this invention, a cathode follower may be employed to isolate the computer from the "B" coil so that no current is drawn through the "B" coil. This may result in more accurate indications of power loss, since a small amount of error does arise from allowing current to flow through the "B" coil.

It will be understood, of course, that while the form of the invention herein shown and described constitutes a preferred embodiment of the invention, it is not intended herein to illustrate all of the possible equivalent forms or ramifications thereof. It will also be understood that the words used are words of description rather than of limitation, and that various changes may be made without departing from the spirit or scope of the invention herein disclosed, and it is aimed in the appended claims to cover all such changes as fall within the true spirit and scope of the invention.

What we claim as new and desire to secure by Letters Patent of the United States is:

1. In an apparatus for determining the power losses of a sheet of magnetic material, means inducing a predetermined flux in said sheet, first inductive means surrounding said sheet providing a first voltage output proportional to the flux in said sheet, second inductive means adjacent said sheet providing a second voltage output proportional to the flux in the field adjacent said sheet, means integrating said second voltage and means actuated by said first voltage and said integrated second voltage for indicating said energy losses.

2. In an apparatus for determining the power losses of a sheet of magnetic material, first inductive means surrounding said sheet for inducing therein a predetermined flux, second inductive means surrounding said sheet internal to said first inductive means and providing a first voltage output proportional to the flux in said sheet, third inductive means adjacent said sheet internal to said first inductive means providing a second voltage output proportional to the flux in the field adjacent said sheet, means integrating said second voltage, a wattmeter having first and second windings, and means connecting said first voltage to said first winding and said integrated second voltage to said second winding.

3. In an apparatus for determining the power losses per unit weight of a sheet of magnetic material, means inducing a predetermined constant flux density in said sheet, means providing a first voltage output proportional to said flux density, means providing a second voltage proportional to the effective current magnetizing said sheet, and means actuated by said first voltage and said second voltage for indicating said losses.

4. In an apparatus for determining the power losses per unit weight of a sheet of magnetic material, means inducing a predetermined constant flux density in said sheet, means providing a first voltage output proportional to said flux density, inductive means adjacent said lamination providing a second voltage proportional to the flux in the field adjacent said lamination, means integrating said second voltage, and means actuated by said first voltage and said second voltage for indicating said losses.

5. In an apparatus for determining the power losses per unit weight of a sheet of magnetic material, first inductive means for inducing a flux in said sheet and providing a first voltage proportional to the magnetizing force applied to said sheet, a variable voltage source for energizing said first inductive means, second inductive means providing a second voltage proportional to the flux in said sheet, computer means connected to said second voltage providing a third voltage proportional to the flux density in said sheet, servo means connected to said computer means for maintaining constant flux density in said lamination by controlling said variable voltage source, and means connecting said first and third voltages to a wattmeter.

6. In an apparatus for determining the power losses per unit weight of a sheet of magnetic material, first coil means surrounding said sheet for inducing a flux in said sheet, a variable voltage source for energizing said first coil means, a second coil means surrounding said sheet inside of said first coil means providing a first voltage output proportional to the flux in said sheet, computer means connected to said second coil means providing a second voltage proportional to the flux density in said sheet, servo means connected to said computer means for maintaining a predetermined constant flux density in said lamination by controlling said variable voltage source means providing a third voltage proportional to the current energizing said sheet, and means connecting said second and third voltages to a wattmeter.

7. In an apparatus for determining the power losses per unit weight of a sheet of magnetic material, first coil means surrounding said sheet for inducing a flux in said sheet, a variable voltage source for energizing said first coil means, a second coil means surrounding said sheet inside of said first coil means providing a first voltage output proportional to the flux in said sheet, flux density computer means connected in series with said second coil means, and providing second and third voltage outputs proportional to the flux density, in said sheet, servo means actuated by said second voltage output for maintaining a predetermined constant flux density in said lamination and maintaining said third voltage proportional to said flux density by controlling said variable voltage source, means providing a fourth voltage proportional to the current energizing said sheet, and means connecting said third and fourth voltages to a wattmeter.

8. In an apparatus for determining the power losses per unit weight of a sheet of magnetic material, first coil means surrounding said sheet for inducing a flux in said sheet, a variable voltage source for energizing said first coil means, a second coil means surrounding said sheet inside of said first coil means providing a first voltage output proportional to the flux in said sheet, flux density computer means connected in series with said second coil means and providing a second and third voltage outputs each proportional to the flux density in said sheet, servo means actuated by said second voltage output for maintaining a predetermined constant flux density in said sheet and maintaining said third voltage proportional to said flux density by controlling said variable voltage source, third coil means adjacent said sheet inside of said first coil means for providing a fourth voltage output proportional to the flux in the field adjacent said sheet, means integrating said fourth voltage, and means connecting said third voltage and said integrated fourth voltage to a wattmeter.

9. In an apparatus for determining the power losses per unit weight of a sheet of magnetic material, first coil means surrounding said sheet for inducing a flux in said sheet, a variable voltage source for energizing said first coil means, a second coil means surrounding said sheet inside of said first coil means providing a first voltage output proportional to the flux in said sheet, flux density computer means connected in series with said second coil means, said computer means comprising a first potentiometer means connected in series with a second potentiometer means, variable resistance means connected to said second coil means and in series with said potentiometer means and having a voltage drop proportional to the area of said sheet, servo means connected to the arm of said first potentiometer means for maintaining a predetermined constant flux density in said sheet by controlling said variable voltage source, the arm of said second potentiometer providing a second potential proportional to said flux density, means providing a third voltage proportional to the current energizing said sheet, a wattmeter, and amplifying means connecting said second and third voltages to said wattmeter.

10. In an apparatus for determining the power losses per unit weight of a sheet of magnetic material, first coil means surrounding said sheet for inducing a flux in said sheet, a variable voltage source for energizing said first coil means, a second coil means surrounding said sheet inside of said first coil means providing a first voltage output proportional to the flux in said sheet, flux density computer means connected in series with said second coil means, said computer means comprising a first potentiometer means connected in series with a second potentiometer means, variable resistance means connected to said second coil means in series with said potentiometers and having a voltage drop proportional to the area of said sheet, servo means connected to the arm of said first potentiometer means for maintaining a predetermined constant flux density in said sheet by controlling said variable voltage source, the arm of said second potentiometer providing a second potential proportional to said flux density, third coil means adjacent said sheet inside of said first coil means providing a third voltage proportional to the flux in the field adjacent said sheet, means integrating said third voltage, a wattmeter, and amplifying means connecting said second voltage and said integrated third voltage to said wattmeter.

11. In an apparatus for determining the power loss per unit weight of a sheet of magnetic material, first coil means surrounding said sheet for inducing a flux in said sheet, a variable voltage source energizing said first coil means, a second coil means surrounding said sheet inside of said first coil means and providing a first voltage output proportional to the flux in said sheet, flux density computer means connected in series with said second coil means, said computer comprising a first potentiometer having a resistance proportional to the width of said sheet, a second potentiometer having a resistance proportional to the thickness of said sheet, said second potentiometer being in series with third and fourth potentiometers having arms, said second, third and fourth potentiometers being in series with said first potentiometer and in parallel with a fifth potentiometer to form a parallel circuit, said fifth potentiometer being mechanically coupled to said second potentiometer so that variations made on said second potentiometer do not vary the resistance of said parallel circuit, the circuit values of said computer circuit being selected so that the second and third voltages at the arm of said third and fourth potentiometers respectively are proportional to the flux density of said sheet, servo means connected to the arm of said fourth potentiometer and coupled to said variable voltage source to maintain said flux density constant, means providing a fourth voltage proportional to the current magnetizing said sheet, a wattmeter, and means connecting said second and fourth voltages to said wattmeter.

12. In an apparatus for determining the power loss per unit weight of a sheet of magnetic material, first coil means surrounding said sheet for inducing a flux in said sheet, a variable voltage source energizing said first coil means, a second coil means surrounding said sheet inside of said first coil means and providing a first voltage output proportional to the flux in said sheet, flux density computer means connected in series with said second coil means, said computer comprising a first potentiometer having a resistance proportional to the width of said sheet, a second potentiometer having a resistance proportional to the thickness of said sheet, said second potentiometer being in series with third and fourth potentiometers having arms, said second, third and fourth potentiometers being in series with said first potentiometer and in parallel with a fifth potentiometer to form a parallel circuit, said fifth potentiometer being mechanically coupled to said second potentiometer so that variations made on said second potentiometer do not vary the resistance of said parallel circuit, the circuit values of said computer circuit being selected so that the second and third voltages at the arm of said third and fourth potentiometers respectively are proportional to the flux density of said sheet, servo means connected to the arm of said fourth potentiometer and coupled to said variable voltage source to maintain said flux density constant, third coil means adjacent said sheet inside of said first and second coils and providing a fourth voltage proportional to the flux in the field adjacent said sheet, means integrating said fourth voltage, a wattmeter, and means connecting said second and integrated fourth voltages to said wattmeter.

13. In an apparatus for determining the power losses per unit weight of a sheet of magnetic material, means inducing a predetermined constant flux density in said sheet, means providing a first voltage output proportional to said flux density, means including core means disposed in a magnetic field adjacent said sheet and not encircling said sheet providing a second voltage proportional to the effective current magnetizing said sheet, and means actuated by said first voltage and said second voltage for indicating said losses.

References Cited in the file of this patent

UNITED STATES PATENTS

| | | |
|---|---|---|
| 2,054,020 | Journeaux | Sept. 8, 1936 |
| 2,101,780 | Kinsley | Dec. 7, 1937 |
| 2,138,965 | Gundersen | Dec. 6, 1938 |
| 2,176,279 | Shenk | Oct. 17, 1939 |
| 2,610,230 | Wiegand | Sept. 9, 1952 |